(12) United States Patent
Daimon et al.

(10) Patent No.: US 6,414,100 B1
(45) Date of Patent: Jul. 2, 2002

(54) BIS(BENZOTRIAZOLYL PHENOL) COMPOUND, ULTRAVIOLET ABSORBER, ULTRAVIOLET-ABSORBING POLYMER, RESIN COMPOSITION AND COATING MATERIAL CONTAINING THESE INGREDIENTS

(76) Inventors: Emiko Daimon; Koji Mori; Mitsuo Akada, all of c/o Otsuka Chemical Co., Ltd., Tokushima Research Laboratories, 463, Kagasuno, Kawauchi-cho, Tokushima-shi, Tokushima (JP), 771-0193

( * ) Notice: Subject to any disclaimer, the term of this patent is extended or adjusted under 35 U.S.C. 154(b) by 0 days.

(21) Appl. No.: 09/581,162
(22) PCT Filed: Oct. 6, 1999
(86) PCT No.: PCT/JP99/05525
§ 371 (c)(1),
(2), (4) Date: Jun. 13, 2000
(87) PCT Pub. No.: WO00/21937
PCT Pub. Date: Apr. 20, 2000

(30) Foreign Application Priority Data

Oct. 14, 1998 (JP) .............................. 10-291847

(51) Int. Cl.[7] ...................... C08F 126/06; C07D 249/20
(52) U.S. Cl. ...................... 526/261; 526/259; 526/313; 526/328.5; 548/255; 548/257
(58) Field of Search ................ 548/255, 257; 526/259, 261, 313, 328.5

(56) References Cited

FOREIGN PATENT DOCUMENTS

EP        0441746 A    8/1991

*Primary Examiner*—Helen L. Pezzuto

(57) ABSTRACT

A novel compound suitable for use as an ultraviolet absorber is provided. Further provided are a resin composition and a coating material each containing the novel compound. A bis(benzotriazolyl phenol) compound represented by the following general formula (1), a resin composition containing the compound, and an ultraviolet-absorbing polymer prepared by copolymerization of the compound:

(1)

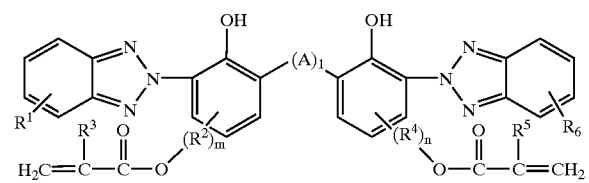

[wherein A represents a methylene group, a $(CH_3)_2C$ group or a $C_2H_5(CH_3)C$ group; $R^1$ and $R^6$, either identical to or different from each other, represent a hydrogen atom, an alkyl group having 1–4 carbon atoms, an aryl group, an alkoxy group having 1–4 carbon atoms or a halogen atom; $R^2$ and $R^4$, either identical to or different from each other, represent a straight-chain or branched alkylene group having 1–6 carbon atoms; $R^3$ and $R^5$ each represents a hydrogen atom or a methyl group; and 1, m and n each indicates 0 or 1].

10 Claims, No Drawings

BIS(BENZOTRIAZOLYL PHENOL) COMPOUND, ULTRAVIOLET ABSORBER, ULTRAVIOLET-ABSORBING POLYMER, RESIN COMPOSITION AND COATING MATERIAL CONTAINING THESE INGREDIENTS

TECHNICAL FIELD

The present invention relates to a novel bis(benzotriazolyl phenol) compound suitable for use as an ultraviolet absorber, and also to a resin composition and a coating material respectively containing the novel compound.

BACKGROUND ART

Under the advances of high-performance polymer materials, there is an increasing need to impart improved weather resistance to polymer materials. Various types of ultraviolet absorbers have been developed for the purpose of imparting increased weather resistance to resins. However, conventionally-known ultraviolet absorbers have various problems since most of them are of low-molecular additive-type.

Specifically, conventional ultraviolet absorbers have higher vapor pressures because of their low-molecular nature and thus show a tendency to volatilize when blended in resins for fabrication, which reduces yield rates, causes contamination of molds or dies, and injures workers' health. Also, they are reported to bleed out from fabricated products or coating surfaces, or dissolve out with the prolonged exposure at working atmosphere to rain or water containing detergents, thereby damaging product appearances and also making it difficult for those products to retain their light stability over a long period.

For the purposes of solving the above-described problems, methods have been recently proposed which utilize reactive-type ultraviolet absorbers or polymeric-type ultraviolet absorbers prepared by polymerizing the reactive-type ultraviolet absorbers to impart the increased ultraviolet-absorbing capacity.

For example, Japanese Patent Publication No. Sho 38-25036 and Japanese Patent Laid Open No. Hei 5-271203 describe benzotriazole-based ultraviolet absorbers having an addition polymerized side chain and weather-resistant resins containing those absorbers as compolymeric components. Because these ultraviolet absorbers are introduced by optional proportions into resins for chemical bonding to their polymer chains, the occurrences of bleed-out, extraction by rainwater and vaporization thereof at high-temperature processings, which have been conventional problems, can be avoided to thereby impart the increased long-term weather resistance to those resins.

However, since the above-described reactive-type ultraviolet absorbers have only one addition polymerized side chain, their addition to thermosetting resins tends to adversely affect properties inherent to those thermosetting resins. Particularly when desired to introduce ultraviolet screening capability to ultraviolet or electron beam curable resins, a large amount of ultraviolet absorber must be added thereto. This results in a marked reduction of crosslinking density. Curing by the crosslinking accordingly becomes difficult to impart the sufficient levels of hardness, abrasion resistance to those resins. Therefore, they can not be used as coating materials purposed to protect molded or extruded products.

DISCLOSURE OF THE INVENTION

An object of the present invention is to provide a novel compound having a utility as an ultraviolet absorber which can solve the above-described problems, a resin composition and a coating material respectively containing the novel compound.

The bis(benzotriazolyl phenol) compound of the present invention is a novel compound represented by the following general formula (1):

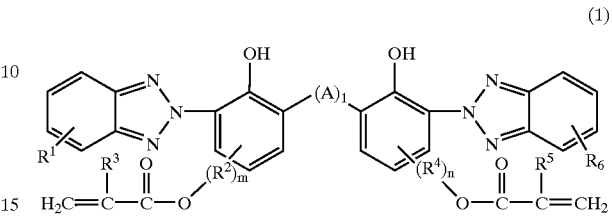

(wherein: A represents a methylene group, a $(CH_3)_2C$ group or a $C_2H_5(CH_3)C$ group; $R^1$ and $R^6$, either identical to or different from each other, represent a hydrogen atom, an alkyl group having 1–4 carbon atoms, an aryl group, an alkoxy group having 1–4 carbon atoms or a halogen atom; $R^2$ and $R^4$, either identical to or different from each other, represent a straight-chain or branched alkylene group having 1–6 carbon atoms; $R^3$ and $R^5$ each represents a hydrogen atom or a methyl group; and 1, m and n each denotes 0 or 1.)

The bis(benzotriazolyl phenol) compound of the present invention, as represented by the above-specified general formula (1), has a good ultraviolet-absorbing capacity for its high molecular absorption coefficient, an extremely low vapor pressure and a high thermal stability. Accordingly, it shows little vaporization when blended in resins and can be blended in resins stably without showing the tendency to decompose. This makes the compound suitable for use as an additive-type ultraviolet absorber.

Also, the bis(benzotriazolyl phenol) compound (1) of the present invention has two highly-reactive addition-polymerizable groups in a molecule. The copolymerization thereof with an addition polymerizable monomer thus allows introduction of optional proportions of ultraviolet-absorbing units into a resulting polymer. The resulting ultraviolet-absorbing copolymer has such an extremely low vapor pressure that it hardly loses its ultraviolet-absorbing capacity even when exposed to heat during fabrication. Also, this ultraviolet-absorbing copolymer, when contained in resins, shows no tendency to bleed out from resin products, so that it is able to impart the sufficient long-term weather resistance to the resin products.

Also, the compound of the present invention has an extremely low vapor pressure and a high decomposition temperature, as described above, so that its vaporization, decomposition and the like are not likely to occur even during polymerization at high temperatures. Accordingly, copolymerization thereof with unsaturated polymers results in the highly efficient production of weather-resistant polymers with optional molecular weights.

Also, the compound of the present invention has such a structure that another ultraviolet-absorbing molecular group is located on a carbon atom adjacent to a phenolic hydroxyl-substituted carbon atom. This structure serves to hinder the phenolic hydroxyl-group, which plays the most important roll in the development of ultraviolet absorbing capacity, from reacting with metal ions, so that the compound of the present invention can exhibit an excellent ultraviolet-absorbing performance even in the presence of metal ions.

Unlike the conventional reactive-type ultraviolet absorbers, the compound of the present invention has plural addition polymerizable groups, i.e., (meth)acryloyl groups. This makes it suitable for use as an ultraviolet-absorbing crosslinking agent. Accordingly, when incorporated in active energy radiation curable resins, such as ultraviolet and electron beam curable resins, the ultraviolet absorber of the present invention itself serves as a crosslinking agent so that the reduction in crosslinking density of those resins can be avoided. This results in imparting excellent weather resistance and ultraviolet screening capability to those resins without adversely affecting their hardness, chemical resistance and abrasion resistance.

Specific examples of those groups represented in the general formula (1) are listed below.

Examples of alkyl groups having 1–4 carbon atoms include methyl, ethyl, n-propyl, isopropyl, n-butyl, isobutyl, tert-butyl groups and the like.

Examples of aryl groups include phenyl, naphthyl groups and the like. A substituting group, such as an alkyl group having 1–4 carbon atoms, an alkoxy group having 1–4 carbon atoms, a halogen atom or the like, may be located on the aromatic ring.

Examples of alkoxy groups include methoxy, ethoxy, n-propoxy, isopropoxy, n-butoxy, tert-butoxy groups and the like.

Examples of halogen atoms include a fluorine atom, a chlorine atom, a bromine atom and an iodine atom.

Illustrative of alkylene groups having 1–6 carbon atoms are straight-chain and branched groups, including methylene, ethylene, trimethylene, tetramethylene, pentamethylene, hexamethylene, ethylidene, propylene, propylidene, ethylethylene, 2-butylidene, 1-methyl trimethylene, 2-methyl trimethylene, 2,2-dimethyl trimethylene.

Specific examples of bis(benzotriazolyl phenol) compounds (1) of the present invention include the following compounds:

2,2'-methylenebis[6-(2H-benzotriazole-2-yl)-4-(meth) acryloyloxy-2-hydroxybenzene], 2,2'-methylenebis[6-(2H-benzotriazole-2-yl)-4-((meth) acryloyloxymethyl)phenol], 2,2'-methylenebis[6-(2H-benzotriazole-2-yl)-4-(2-(meth) acryloyloxyethyl)phenol], 2,2 '-methylenebis[6-(5-chloro-2H-benzotriazole-2-yl)-4-(2-(meth)acryloyloxyethyl)phenol], 2,2'-methylenebis[6-(5-bromo-2H-benzotriazole-2-yl)-4-(2-(meth)acryloyloxyethyl)phenol], 2,2'-methylenebis[6-(2H-benzotriazole-2-yl)-4-(3-(meth) acryloyloxypropyl)phenol], 2,2'-methylenebis[6-(5-chloro-2H-benzotriazole-2-yl)-4-(3-(meth)acryloyloxypropyl)phenol], 2,2'-methylenebis[6-(5-bromo-2H-benzotriazole-2-yl)-4-(3-(meth)acryloyloxypropyl)phenol], 2,2'-methylenebis[6-(2H-benzotriazole-2-yl)-4-(2-(meth) acryloyloxypropyl)phenol], 2,2'-methylenebis[6-(5-chloro-2H-benzotriazole-2-yl)-4-(2-(meth)acryloyloxypropyl)phenol], 2,2'-methylenebis[6-(5-bromo-2H-benzotriazole-2-yl)-4-(2-(meth)acryloyloxypropyl)phenol], 2,2'-methylenebis[6-(2H-benzotriazole-2-yl)-4-(4-(meth) acryloyloxybutyl)phenol], 2,2'-methylenebis[6-(5-chloro-2H-benzotriazole-2-yl)-4-(4-(meth)acryloyloxybutyl)phenol], 2,2'-methylenebis[6-(5-bromo-2H-benzotriazole-2-yl)-4-(4-(meth) acryloyloxybutyl)phenol], 3,3-{2,2'-bis[6-(2H-benzotriazole-2-yl)-1-hydroxy-4-(2-(meth)acryloyloxyethyl)phenyl]}propane, and 2,2-{2,2'-bis[6-(2H-benzotriazole-2-yl)-1-hydroxy-4-(2-(meth)acryloyloxyethyl)phenyl]}butane.

The bisbenzotriazole compound (1) of the present invention can be prepared, for example, according to the following procedure.

A 2-benzotriazolyl phenol compound is provided which has the following general formula (2):

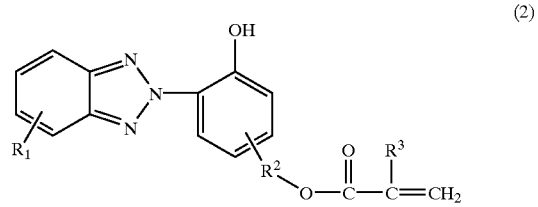

(2)

(wherein $R^1$, $R^2$ and $R^3$ are identical to those described above). The 2-benzotriazolyl phenol compound (2) is allowed to react with an amine compound and a formaldehyde derivative in a solvent, so that it is converted to an aminomethyl compound which has the following general formula (3):

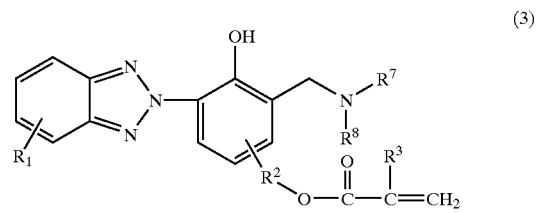

(3)

(wherein $R^1$, $R^2$ and $R^3$ are identical to those described above; $R^7$ and $R^8$, either identical to or different from each other, represent a hydrogen atom or a lower alkyl group having 8 or less carbon atoms; and $R^7$ and $R^8$ may be coupled to each other). The aminomethyl compound (3) is then allowed to undergo a coupling reaction with the 2-benzotriazolyl phenol compound (2) in an organic solvent under basic conditions, resulting in the production of the bisbenzotriazole compound (1) of the present invention.

The bisbenzotriazole compound (1) of the present invention can also be prepared according to the following procedure.

A 2-benzotriazolyl phenol compound is provided which has the following general formula (4)

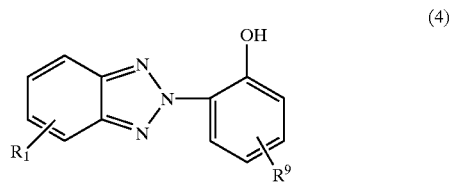

(4)

(wherein $R^1$ is identical to that described above, and $R^9$ represents a straight-chain or branched-chain hydroxyalkyl group having 1–6 carbon atoms). The 2-benzotriazolyl phenol compound (4) is then allowed to react with an amine compound and a formaldehyde derivative in a solvent, so that it is provisionally converted to an aminomethyl compound which has the following general formula (5):

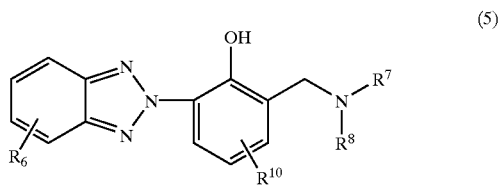

(5)

(wherein $R^6$ is identical to that described above, and $R^{10}$ represents a straight-chain or branched-chain hydroxyalkyl group having 1–6 carbon atoms). The aminomethyl compound (5) is further allowed to react with the benzotriazole compound (4) in an organic solvent under basic conditions, so that it is converted to a bisbenzotriazole compound which has the following general formula (6):

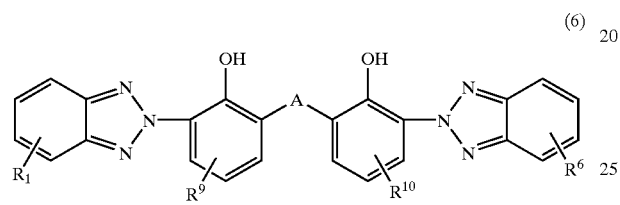

(6)

(wherein A, $R^1$, $R^6$, $R^9$ and $R^{10}$ are identical to those described above). The subsequent esterification of the bisbenzotriazole compound (6) results in the production of the bisbenzotriazole compound (1) of the present invention.

The 2-benzotriazolyl phenol compound (2) for use as the starting material can be produced, for example, according to the method disclosed in Japanese Patent Laid Open No. Sho 60-38411.

That is, an o-nitroaniline compound is allowed to react with sodium nitrite to provide a diazonium salt which has the following general formula (7):

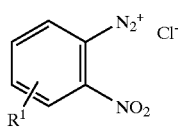

(7)

(wherein $R^1$ is identical to that described above). The diazonium salt (7) is then allowed to undergo an azo-coupling reaction under basic conditions with hydroxyalkyl phenol which has the following general formula (8):

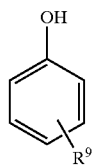

(8)

(wherein $R^9$ is identical to that described above) The reaction results in obtaining a 2-[(2-nitrophenyl)azo] hydroxyalkyl phenol compound which has the following general formula (9):

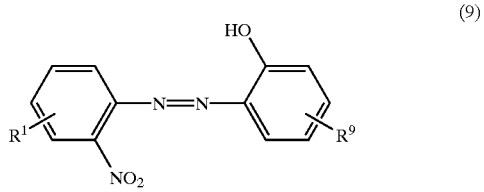

(9)

(wherein $R^1$ and $R^9$ are identical to those described above).

This compound (9) is then reduced under basic conditions to obtain a hydroxyalkyl-2-benzotriazolyl phenol compound which has the following general formula (4):

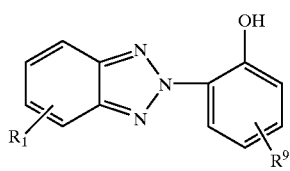

(4)

(wherein $R^1$ and $R^9$ are identical to those described above).

The subsequent esterification of the compound (4) with acrylic acid or methacrylic acid readily results in the production of the 2-benzotriazolyl phenol compound (2).

Also, the Mannich base compound (3) can be produced by reacting the 2-benzotriazolyl phenol compound (2) in a solvent for 1–30 hours, in the presence of an amine compound and a formaldehyde derivative, each in 1.0–3.0 equivalents. Also, the Mannich base compound (5) can be produced by treating the 2-benzotriazolyl phenol compound (4) in the similar manner. Preferred amine compounds for use in the present invention include primary amines such as monomethylamine, monoethylamine, monopropylamine, monobutyl-amine, monoamylamine and monohexylamine; secondary amines such as dimethylamine, diethylamine, di-n-propylamine, di-isopropylamine, di-n-butylamine, di-tert-butylamine, di-isobutylamine, diamylamine, dihexylamine, ethylmethylamine, methyl-isopropylamine and ethyl-isopropylamine; and cyclic amines such as morpholine, piperidine and pyrrolidine derivatives.

Also, preferred formaldehyde derivatives for use in the present invention include formaldehyde and its aqueous solution; straight-chain oligomers such as paraformaldehyde; and cyclic oligomers such as trioxane and tetraoxymethylene.

Examples of solvents for use in the present invention include alcohols such as methanol, ethanol, isopropanol, n-propanol, n-butanol, isobutanol and tert-butanol; aliphatic hydrocarbons such as petroleum ether, hexane and heptane; aromatic hydrocarbons such as benzene, toluene and xylene; ethers such as diethyl ether, dibutyl ether, THF and dioxane; and esters such as ethyl acetate, propyl acetate and butyl acetate. These can be used alone or in any combination thereof depending upon the particular purpose contemplated. Also, the amount of the solvent used is not particularly specified, and may be chosen depending upon the ease of agitation, reaction temperature and solubility of substrate. In general, it is preferably in the range of 50–500% by weight, relative to the 2-benzotriazolyl phenol compound represented by the general formula (2) or (4).

The reaction temperature is in the range of 20–200° C., preferably in the range of 30–150° C., and may be suitably chosen depending upon the type of solvent used.

The 2,2'-bis(6-benzotriazolyl phenol) compound (1) of the present invention can be prepared by reacting the Mannich base compound (3) or (5) with the substantially equimolar 2-benzotriazolyl phenol compound (4) or (2) in a solvent for 1–100 hours under the presence of an alkaline catalyst.

Preferable alkaline catalysts include alkaline metal alkoxides such as sodium methoxide, sodium ethoxide, sodium-n-propoxide and sodium-i-propoxide; and inorganic bases such as sodium hydroxide, potassium hydroxide, sodium carbonate and potassium carbonate. These may be used alone or in any combination thereof.

The amount of the alkaline catalyst used is not particularly specified, but may preferably be in the range of 0.01–10% by weight, relative to the Mannich base compound (3) or (5). Examples of solvents include alcohols such as methanol, ethanol, isopropanol, n-propanol, n-butanol, isobutanol and tert-butanol; aliphatic hydrocarbons such as petroleum ether, hexane and heptane; aromatic hydrocarbons such as benzene, toluene and xylene; ethers such as diethyl ether, dibutyl ether, THF and dioxane; and esters such as ethyl acetate, propyl acetate and butyl acetate. These may be used alone or in any combination thereof depending upon the particular purpose contemplated. Also, the amount of the solvent used is not particularly specified, and may be chosen depending upon the ease of agitation, reaction temperature and solubility of substrate. In general, it is preferably in the range of 50–500% by weight, relative to the Mannich base compound (3) or (5).

The reaction temperature is in the range of 20–200° C., preferably in the range of 30–150° C., and may be suitably chosen depending upon the type of solvent used.

The bisbenzotriazole compound (1) of the present invention has a high molecular absorption coefficient, good ultraviolet absorbency, extremely low vapor pressure and low thermal stability, which make it particularly effective for use as an additive-type ultraviolet absorber for various resins including engineer plastics that demand high-temperature fabrication.

The ultraviolet absorber of the present invention can be added to any type of resin. Specific examples of resins include polyvinyl chloride, polyvinylidene chloride, polyolefin, polycarbonate, polystyrene, acrylic resin, methacrylic resin, polyamide, polyester, acrylonitrile-butadiene-styrene (ABS) resin, thermoplastic polyurethane resin, vinyl chloride-vinylidene chloride-acrylonitrile copolymer, acrylonitrile-styrene (AS) resin, vinyl acetate resin, polyphenylene ether, polysulfone, polyether sulfone, polyether ether ketone, and liquid crystal plastics.

The ultraviolet absorber of the present invention is preferably used within 0.1–50 parts by weight, preferably within 0.5–30 parts by weight, based on 100 parts by weight of the base resin.

If the amount of the ultraviolet absorber used is below 0.1 parts by weight, the attempt to impart a higher level of weather resistance to the resin may fail. On the other hand, if it exceeds 50 parts by weight, basic physical properties of the resin may be adversely affected. The ultraviolet absorbers of the present invention can be used in any combination thereof, and optionally in combination with other additives such as a light stabilizer, antioxidant, plasticizer, flame retardant, antistatic agent, filler, pigment and colorant.

The ultraviolet absorber of the present invention can be added in an arbitrary stage during a manufacturing process of a polymer, or alternatively, either prior to or after fabrication of the polymer according to a conventional technique.

The ultraviolet absorber of the present invention can be incorporated in the polymer by simply allowing it to dissolve in the polymer. Preferably, the ultraviolet absorber is copolymerized with a comonomer (unsaturated monomer) so that it is introduced into the resulting polymer. By doing so, copolymers containing the novel ultraviolet absorbent compound of the present invention as their copolymeric unit and having optional compositions and molecular weights can be obtained which show no tendency to lose their ultraviolet-absorbing capabilities by elution or evaporation, and accordingly retain high levels of light-resistance.

The type of the comonomer used is not particularly limited, so long as it is polymerizable with the ultraviolet absorber (1) of the present invention. Examples of such comonomers include styrene, methylstyrene, acrylic ester, methacrylic ester, acrylamide, acrylonitrile, methacrylonitrile, vinyl acetate, vinylidene chloride, vinyl chloride, and α-olefins such as ethylene, propylene, butadiene, isoprene and dodecene. These comonomers may be used alone or in any combination thereof.

The polymerization process is not particularly limited, so long as it is able to provide desired polymers, and may be free-radical polymerization such as bulk polymerization, solution polymerization, suspension polymerization, emulsion polymerization or electron beam polymerization; or ionic polymerization such as anionic polymerization or cationic polymerization.

Also, the present compound (1) can be rendered into an ultraviolet-absorbing graft polymer via a polymeric reaction with a polymer graft-polymererizable with the compound. Preferred polymers graft-polymerizable with the present compound (1) include, for example, polyolefins such as polyethylene, polypropylene and ethylene-propylene copolymer.

Graft polymerization of the present compound (1) with the graft-polymerizable polymer can be achieved by conventionally-known techniques. For example, the present compound (1), either alone or in combination with at least one graft-polymerizable unsaturated monomer, may be allowed to react with the aforementioned polymer in the presence of an azo-based free-radical initiator such as azobisisobutyronitrile, or of a peroxide such as benzoyl peroxide, di-tert-butyl peroxide, tert-butyl hydroperoxide or methyl ethyl ketone peroxide. The graft polymerizable unsaturated monomer is not particularly specified, and may be styrene, methylstyrene, acrylic ester, methacrylic ester, acrylamide, acrylonitrile, methacrylonitrile or vinyl acetate, for example.

The reactor in which the reaction takes place is not particularly limited, so long as its use results in obtaining desired graft polymers. Applicable reactors may include general-purpose glass and metal containers, extruders and kneaders, for example.

Desired graft polymers can also be provided by irradiating polymers which contain the present compound (1) alone or the mixture of the present compound (1) and at least one graft-polymerizable unsaturated monomer with an active energy radiation such as an electron beam or γ-ray.

The copolymer (ultraviolet-absorbing polymer of the present invention) obtained by copolymerization of the present compound (1) with the copolymerizable commonomer serves as the weather-resistance polymer which can be formed into films, coatings, fibers, shaped articles and the like. It may alterntatively be added, as the additive-type ultraviolet absorber, to other polymers.

When the ultraviolet-absorbing polymer of the present invention is formed, as the weather-resistant polymer, into films, coatings, fibers, shaped articles and the like, the content of the ultraviolet-absorbing unit (unit of the 2,2'-bis (6-benzotriazolyl phenol) compound represented by the general formula (1)) of the present invention is preferably maintained within the range of 0.01–5% by weight. If the ultraviolet-absorbing unit content falls below 0.01% by weight, the weather resistance of the polymer may become insufficient. On the other hand, if it exceeds 5% by weight, the increased crosslinking density of the polymer may result which presents difficulties in later processing the polymer.

As stated above, the ultraviolet-absorbing polymer of the present invention can be used as the additive-type ultraviolet absorber for addition to resins, if so desired. Such resins may be those referred to above as allowing the addition of the ultraviolet abosorber of the present invention, for example. The ultraviolet-absorbing polymer of the present invention may preferably be incorporated in the resin so that the ultraviolet absorber unit content falls within the range of 0.01–5% by weight.

The polymers (resins) containing the ultraviolet absorber of the present invention, the ultraviolet-absorbing polymers of the present invention, and the polymers (resins) containing the ultraviolet-absorbing polymers of the present invention may be hereinafter referred to as "the present polymers and polymer compositions", inclusively.

The present polymers and polymer compositions can also be used in combination with other additives, if so desired. Such additives include, for example, a ligh stabilizer, antioxidant, flame retardant, antistatic agent, plasticizer, filler, pigment, colorant and the like.

The present polymers and polymer compositions, because of their excellent ultraviolet absorbency, exhibit good performances in such applications that require higher levels of weather resistance.

The present polymers and polymer compositions can be fabricated as similar to conventionally-employed polymers. For example, they can be formed into shapes by conventional methods, such as injection molding, extrusion, blow molding, biaxial centrifugal blow molding, press molding, melt spinning and the like. Also, they can be formed into coatings by allowing them to dissolve, disperse or emulsify in a suitable solvent or aqueous system. After removal of such a solvent, they may be added in the powder form to powder coating compositions.

Shaped articles obtained from the present polymers and polymer compositions, because of their higher levels of weather resistance, exhibit good performances particularly in uses under circumstances exposed to an ultraviolet light or sunlight, including construction materials, lamp covers for automobiles and traffic signals, car ports, sound barriers, agricultural and industrial films and sheets, weather-resistant coatings for automobiles and outside walls, coatings for glasses, weather-resistant fibers and the like.

Shaped articles, e.g., packaging materials, containers and fibers, obtained from the present polymers and polymer compositions, are excellent in ultraviolet absorbency and accordingly suitable for use in applications where an ultraviolet light must be screened to protect contents.

In addition to being the ultraviolet absorber, the present compound (1) serves as a crosslinking agent because of its inclusion of plural addition polymerizable groups in a molecule. Therefore, it can be used as an ultraviolet-absorbing active ingredient for curable resins.

Curable resins into which the present compound (1) is incorporated preferably contain, as their active ingredient, a (meth)acrylic compound having at least one (meth) acryloyloxy group in a molecule. Specific examples of such curable resins include thermally-crosslinking curable resins, ultraviolet curable resins, electron beam curable resins and the like. These curable resins have another utility as binder resins for curable coatings. Accordingly, the present compound (1), i.e., the ultraviolet absorber of the present invention can be incorporated, as the ultraviolet-absorbing active ingredient, into such binder resins for curable coatings.

The (meth) acrylic compoud having at least one (meth) acryloyloxy group in a molecule can be selected from those conventionally known in the art. Preferred, among them, is at least one selected from (a) (meth)acrylate oligomers having at least two (meth)acryloyloxy groups in a molecule and (b) (meth)acrylate monomers having at least one (meth) acryloyloxy group in a molecule. Specific examples thereof are below listed.

(a) (Meth)acrylate Oligomers

Examples of (meth)acrylate oligomers having at least two (meth)acryloyloxy groups in a molecule include polyfunctional polyester (meth)acrylate oligomers, polyfunctional urethane (meth)acrylate oligomers, polyfunctional epoxy (meth)acrylate oligomers, polyfunctional ether (meth) acrylate oligomers and the like, respectively having at least two (meth)acryloyloxy groups in a molecule.

Examples of polyfunctional polyester (meth)acrylate oligomers having at least two (meth)acryloyloxy groups in a molecule include compounds synthesized from (meth) acrylic acid, polyols and polybasic acids (anhydrides). Examples of polyols are ethylene glycol, 1,4-butane diol, 1,6-hexane diol, diethylene glycol, triethylene glycol, polyethylene glycol, propylene glycol, dipropylene glycol, polypropylene glycol, neopentyl glycol, dimethylolheptane, dimethylol propionic acid, dimethylol butyrionic acid, trimethylolethane, trimethylolpropane, ditrimethylol propane, pentaerythritol, dipentaerythritol, glycerin and the like. Illustrative of polybasic acids (anhydrides) are malonic acid, succinic acid (anhydride), alkenyl succinic acid, glutaric acid, adipic acid, pimelic acid, cork acid, azelaic acid, sebacic acid, isosebacic acid, maleic acid(anhydride), fumaric acid, itaconic acid (anhydride), phthalic acid (anhydride), isophthalic acid, terephthalic acid, trimellitic acid (anhydride) and the like.

Examples of polyfunctional urethane (meth)acrylate oligomers having at least two (meth)acryloyloxy groups in a molecule include compounds prepared by the reaction of polyisocyanate, polyol and hydroxy (meth)acrylate, as reported in "Fine Chemical" Journal, vol.17, No.19 (pp. 5–14, published in 1988) and in "Fine Chemical" Journal, vol.17, No.20 (pp. 14–25, published in 1988). Examples of polyisocyanates are di- or tri-isocyanates such as hexamethylene diisocyanate, isophorone diisocyanate, methylene-bis (4-cyclohexyl isocyanate), trimethylhexamethylene diisocyanate, tolylene diisocyanate, xylylene diisocyanate, 4,4'-diphenylmethane diisocyanate, diisocyanates obtained via hydrogenation of aromatic isocyanates (e.g., hydrogenated tolylene diisocyanate, hydrogenated xylylene diisocyanate, dicyclohexylmethane diisocyanate and the like), triphenylmethane triisocyanate, dimethylene triphenyl triisocyanate and the like; and polyisocyanates composed of two or more of the above-listed di- and tri-isocyanates. Examples of polyols include aliphatic, alicyclic and aromatic polyols; polyester polyols; polyether polyols and the like. The aliphatic polyols, alicyclic polyols and polyether polyols include, for example, ethylene glycol, 1,4-butanediol, 1,6-hexanediol, diethylene glycol, triethylene glycol, polyethylene glycol, propylene glycol, dipropylene glycol, polypropylene glycol, neopentyl glycol, dimethylol heptane, dimethylol propionic acid, dimethylol butyrionic acid, trimethylol ethane, trimethylol propane, ditrimethylol propane, pentaerythritol, dipentaerythritol, glycerin, hydrogenated bisphenol-A and the like. The aromatic polyols include, for example, ethoxylated bisphenol-A, ethoxylated bisphenol-S and the like. The polyester polyols include caprolactone-modified diol, for example. Also, the hydroxy (meth)acrylates include 2-hydroxyethyl (meth)acrylate, 2-hydroxypropyl (meth)acrylate, 4-hydroxy-butyl(meth) acrylate, glycerol di(meth)acrylate, glycerol acrylate/ methacrylate, pentaerythritol tri(meth)acrylate and the like, for example.

Examples of polyfunctional epoxy (meth)acrylate oligomers having at least two (meth)acryloyloxy groups in a molecule include compounds prepared by the addition reaction of polyglycidyl ether and (meth)acrylic acid. Illustrative of polyglycidyl ethers are ethylene glycol diglycidyl ether, propylene glycol diglycidyl ether, tripropylene glycol diglycidyl ether, 1,6-hexanediol diglycidyl ether and bisphenol-A diglycidyl ether.

Useful polyfunctional ether (meth)acryiate oligomers include compounds obtained by allowing polyethers, such as prepared by reacting polyols with ethylene oxide or propylene oxide, to undergo an ester exchange reaction with ethyl (meth)acrylate. Illustrative of polyols are glycerin, hexanetriol and the like.

The aforementioned oligomers can be used alone or in any combination thereof. Also, different types of oligomers may be used in combination. Among the aforementiond oligomers, the polyfunctional polyester (meth)acrylate oligomers, poly-functional urethane (meth)acrylate oligomers, polyfunctional epoxy (meth)acrylate oligomers, polyfunctional ether (meth)acrylate oligomers, are preferably prepared from aliphatic or alicyclic compounds for the purpose of improving their weather resistance levels.

(b) (Meth)acrylate Monomers

Examples of (meth)acrylate monomers having at least one (meth)acryloyloxy group in a molecule include polyfunctional and monofunctional (meth)acrylate monomers, such as reported in "Fine Chemical" Journal, vol.21, No.3 (pp. 16–28, published in 1992), "Fine Chemical" Journal, vol.21, No.4 (pp. 16–25, published in 1992) and "Functional Material" Journal, vol.12, No.8 (pp. 52–58, published in 1992).

Examples of polyfunctional (meth)acrylate monomers having at least two (meth)acryloyloxy groups in a molecule include bisphenol-A di(meth)acrylate, ethylene oxide modified bisphenol-A di(meth)acrylate, propylene oxide modified bisphenol-A di(meth)acrylate, ethylene oxide modified bisphenol-F di(meth)acrylate, ethylene oxide modified bisphenol-S di(meth)acrylate, tetrabromobisphenol-A di(meth)acrylate, ethylene glycol di(meth)acrylate, diethylene glycol di(meth)acrylate, epichlorohydrin modified ethylene glycol di(meth)acrylate, glycerol di(meth)acrylate, glycerol (meth) acrylate, glycerol tri (meth) acrylate, epichlorohydrin modified glycerol tri(meth)acrylate, 1,4-butanediol di(meth)acrylate, epichlorohydrin modified-1,4-butanediol di(meth)acrylate, 1,6-hexanedioldi(meth) acrylate, epichlorohydrin modified-1,6-hexanediol di(meth) acrylate, neopentyl glycol di(meth)acrylate, hydroxypivalic acid neopentyl glycol di(meth)acrylate, caprolactone modified hydroxypivalic acid neopentyl glycol di(meth)acrylate, trimethylolpropane tri(meth)acrylate, ethylene oxide modified trimethylolpropane tri(meth)acrylate, propylene oxide modified trimethylolpropane tri(meth)acrylate, epichlorohydrin modified trimethylolpropane tri(meth) acrylate, neopentyl glycol modified trimethylolpropane di(meth)acrylate, dicyclopentanyl di(meth)acrylate, pentaerythritol tri(meth) acrylate, pentaerythritol tetra(meth) acrylate, dipentaerythritol hexa(meth)acrylate, caprolactone modified dipentaerythritol hexa(meth)acrylate, dipentaerythritolmonohydroxy penta(meth)acrylate, alkyl modified dipentaerythritol penta(meth)acrylate, alkyl modified dipentaerythritol tetra(meth)acrylate, alkyl modified dipentaerythritol tri(meth)acrylate, ditrimethylolpropane tetra(meth)acrylate, diethylene glycol di(meth)acrylate, polyethylene glycol di(meth)acrylate, eprichlorohydrin modified polyethylene glycol di(meth)acrylate, tripropylene glycol di(meth)acrylate, polypropylene glycol di(meth) acrylate, epichlorohydrin modified polypropylene glycol di(meth)acrylate, ethylene oxide modified phosphoric acid di(meth)acrylate, ethylene oxide modified phosphoric acid tri(meth)acrylate, caprolactone modified phosphoric acid di(meth)acrylate, ethylene oxide modified phosphoric acid di(meth)acrylate, epichlorohydrin modified phthalic acid di(meth)acrylate, tris{(meth)acryloyloxyethyl} isocyanurate, caprolactone modified tris {(meth) acryloyloxyethyl} isocyanurate, zinc di(meth)acrylate and the like. Other polyfunctional (meth)acrylate monomers include phosphazene compounds having the (meth)acryloyloxy groups, such as hexa{(meth) acryloyloxyethoxy}cyclotriphosphazene and octa{(meth) acryloyloxyethoxy}cyclotetraphosphazene. These may be acylate/methacrylate mixtures, such as glycerol acrylate/ methacrylate.

Examples of monofunctional (meth)acrylate monomers having at least one (meth)acryloyloxy group in a molecule include methyl (meth)acrylate, ethyl (meth)acrylate, propyl (meth)acrylate, butyl (meth)acrylate, 2-ethylhexyl (meth) acrylate, isodecyl (meth)acrylate, lauryl (meth)acrylate, stearyl (meth)acrylate, allyl (meth)acrylate, cyclohexyl (meth)acrylate, methylcyclohexyl (meth)acrylate, isobornyl (meth)acrylate, 2-hydroxyethyl (meth)acrylate, 2-hydroxy propyl (meth)acrylate, caprolactone modified-2-hydroxyethyl (meth)acrylate, glycerol (meth)acrylate, glycidyl (meth) acrylate, 3-chloro-2-hydroxypropyl (meth) acrylate, 2,3-dibromopropyl (meth) acrylate, 2-cyano-ethyl (meth) acrylate, tetrahydrofurfuryl (meth)acrylate, caprolactone modified tetrahydrofurfuryl (meth)acrylate, di-cyclopentanyl (meth) acrylate, dicyclopentenyloxyehtyl (meth)acrylate, N,N-dimethylaminoethyl (meth)acrylate, N,N-diethylaminoethyl (meth)acrylate, trifluoroethyl (meth) acrylate, tetrafluoro-propyl (meth)acrylate, octafluoropentyl (meth)acrylate, heptadecafluorodecyl (meth)acrylate, benzyl (meth)acrylate, 2-ethoxyethyl (meth)acrylate, 2-(2-ethoxyethoxy)-ethyl (meth) acrylate, butoxyethyl (meth) acrylate, 2-methoxyethyl (meth) acrylate, methoxydiethylene glycol (meth) acrylate, methoxytriethylene glycol (meth)acrylate, methoxypolyethylene glycol (meth)acrylate, 2-methoxypropyl (meth) acrylate, methoxydipropylene glycol (meth) acrylate, methoxytripropylene glycol (meth) acrylate, methoxypolypropylene glycol (meth)acrylate, polyethylene glycol (meth) acrylate, polypropylene glycol (meth)acrylate, polyethylene glycol/polypropylene glycol (meth)acrylate, alicyclic modified neopentyl glycol (meth) acrylate, ethylene oxide modified phosphoric acid (meth) acrylate, ethylene oxide modified butoxylated phosphoric acid (meth)acrylate, ethylene oxide modified phenoxylated phosphoric acid (meth)acrylate, trimethoxysilylpropyl (meth)acrylate, sodium sulfonate ethyl (meth)acrylate, ethylene oxide modified succinic acid (meth)acrylate, morpholine (meth)acrylate, phenoxy (meth)acrylate, phenoxyethyl (meth)acrylate, phenoxy diethylene glycol (meth)acrylate, ethylene oxide modified phthalic acid (meth)acrylate, propylene oxide modified phthalic acid (meth)acrylate, (meth) acrylamide, N,N'-dimethyl aminoethyl (meth)acrylate, glycidyl (meth)acrylate, (meth)acrylic acid and the like.

Either of the polyfunctional and monofunctional (meth) acrylate monomers can be used alone or in combination.

Also, the polyfunctional (meth)acrylate monomers can be used in combination with any of the monofunctional (meth) acrylate monomers.

Among the above-listed polyfunctional and monofunctional (meth)acrylate monomers, the use of 1,6-hexanediol acrylate, hydroxypivalic acid neopentyl glycol acrylate, trimethylpropane triacrylate, ethylene oxide modified trimethylolpropane triacrylate, pentaerythritol triacrylate, dipentaerythritol hexaacrylate, tetrahydrofurfuryl acrylate and 2-(2-ethoxyethoxy)ethyl acrylate is preferred.

The ultraviolet absorber of the present invention will be now described as it is incorporated in a curable resin for use in a curable coating. The curable coating including the ultraviolet absorber of the present invention will be hereinafter referred to as the "present coating composition".

For the present coating composition (present coating material), the loading of the bis(benzotriazolyl phenol) compound represented by the above-specified general formula (1) is not particularly specified, and may be suitably chosen from a wide range by considering various conditions, including the end use of the resulting compound; material type and configuration of the substrate to which the present composition is to be applied; hardness and film thickness of the composition after cure; degrees of long-term weather resistance, resistance to metal ions and transparency of the composition after cure; molar absorption coefficient of the ultraviolet absorbent compound and the like. In general, the present compound (1) may be contained in the approximate range of 0.01–50% by weight, preferably of 0.1–50% by weight, more preferably of 0.2–30% by weight, base on the total weight of the present composition. Also, for the ultraviolet absorber, different types of ultraviolet absorbers of the present invention may be used in combination. Alternatively, the present compound (1) may be used in combination with other ultraviolet absorbers.

Various additives known in the art, including, for example, antioxidant, surfactant, leveling agent, heat polymerization inhibitor, light stabilizer, solvent and the like, can be added to the present coating composition within the ranges that do not adversely affect its effectiveness.

Useful antioxidants are known in the art, examples of which include phenol, sulfur, phosphor and amine compounds, such as described in "Handbook of Anitioxidants" (Kenichi Saruwatari et al., Taisei-sha, published in 1976) and "Plastics" Journal, vol.43, No.11 (pp.52–54, published in 1992). Useful phenol compounds include, for example, 2,6-di-tert-butyl-4-methyl phenol, pentaerythrityltetrakis[3-(3',5'-di-tert-butyl-4'-hydroxyphenyl)-propionate], octadecyl-3-(3',5'-di-tert-butyl-4'-hydroxyphenyl)-propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 4,4'-thiobis(3-methyl-6-tert-butylphenol), 2,4-bis-(n-octylthio)-6-(4"-hydroxy-3',5'-tert-butylanilino)-1,3,5-triazine, 2,2'-thiodiethylenebis[3-(3',5'-di-tert-butyl-4'-hydroxyphenyl)-propionate], N,N'-hexamethylenebis (3,5-di-tert-butyl-4-hydroxyhydrocinnamide), 3,9-{2-[3-(3-tert-butyl-4-hydroxy-5-methylphenyl)propionyl-oxy]-1,1-dimethylethyl}-2,4,8,10-tetraoxaspiro[5,5]undecane and the like. Useful sulfur compounds include, for example, dilauryl-3,3'-thiodipropionate, ditridecyl-3,3'-thiodipropionate, dimyristyl-3,3'-thiodipropionate, distearyl3,3'-thiodipropionate, pentaerythrityl-tetrakis (3-laurylthiopropionate), bis{2-methyl-4-(3-n-$C_{12}$ or $C_{14}$ alkylthiopropionyloxy)-5-tert-butylphenyl}sulfide, 2-mercapto-benzimidazole and the like. Useful phosphor compounds include, for example, tris(nonylphenyl) phosphite, triphenylphosphite, tris(2,4-di-tert-butylphenyl) phosphite, diphenyl isodecyl phosphite, diphenyl isooctyl phosphite, distearyl pentaerythritol diphosphite, di(2,4-di-tert-butylphenyl) pentaerythritol diphosphite, tetrakis(2,4-di-tert-butylphenyl)-4,4'-biphenylene diphosphonate and the like. Useful amine compounds include alkylated diphenylamine and the like, for example. Also, the antioxidant can be used in combination with suitable synergistic additives, such as didodecyl-3,3'-thiobispropionate, dioctadecyl-3,3'-thiobis-propionate and hexamethylphosphoric triamide, and other suitable stabilizers.

Useful surfactants are known in the art, examples of which include anionic, cationic, nonionic and amphoteric surfactants, such as described in "New Surfactants" (Hiroshi Horiguchi, Sankyo Publisher, published in 1986).

Useful leveling agents are known in the art, examples of which include polyvinyl butyral, polyalkyl acrylate, dimethylsiloxane and the like.

Useful heat-polymerization inhibitors are known in the art, examples of which include hydroquinone, methoquinone, benzoquinone, 2,6-di-tert-butyl-4-methylphenol and the like.

Useful light stabilizers are known in the art, examples of which include hindered amine compounds, such as reported in "Coloring Material Journal", vol.62, No.4 (pp.215–222, published in 1989).

The solvent is employed for the purposes of adjusting the viscosity of coatings and improving smoothness, eveness or adhesion to a substrate surface of cured coating films. Useful solvents are known in the art, examples of which include water; alcohols such as ethanol, propanol, isopropanol and butanol; aromatic hydrocarbons such as toluene and xylene; esters such as ethyl acetate and butyl acetate; ketones such as acetone, methyl ethyl ketone, methyl isobutyl kotone; ethers such as 2-methoxy ethanol, 2-ethoxy ethanol, 2-ethoxy propanol, 2-(2-ethoxyethoxy) ethanol, 1,4-dioxane and tetrahydrofuran; and various commercial thinners. These solvents can be used in any combination thereof.

The present coating composition may further contain at least one additive selected from an antistatic agent, antifogging agent, antifungus agent, antibacterial agent, flame retardant, filler, pigment and dye, within the range that does not adversely affect its effectiveness.

The present coating composition can be used alone as a curable coating.

The curable coating can be applied to objects by using conventional techniques. For example, the curable coating may be applied onto an object surface, followed by curing thereof to form a coating film. The thickness of coating film may be suitably chosen from a wide range depending on the particular end use contemplated and the like, and is generally made to fall within the approximate range of 0.1–30 $\mu$m, preferably of 1–20 $\mu$m. If the film thickness is maintained within the above-specified range, the coating film results having the sufficient hardness. The occurrence of cracking or delamination of the coating film can also be avoided. As similar to cured films made from conventional (meth)acrylic curable coatings, the cured film made from the present coating composition has high pencil hardness and is excellent in wear resistance, abrasion resistance, adhesion and the like.

The present coating composition can be applied by conventional techniques such as roller coating, gravure coating, flow coating, dip coating, spin coating, spray coating, screen plate processing, etc.

Curing can be achieved by application of heat or by exposure to energy radiations such as an electron beam, ultraviolet radiation and the like.

Curing through the thermal crosslinking can be carried out at temperatures generally within the approximate range of 50–150° C., preferably within the approximate range of 80–130° C., according to conventionally-known techniques. During the curing, an appropriate amount of polymerization initiator may be added, if needed. Examples of initiators include peroxides such as benzoyl peroxide, dicumyl peroxide, di-isopropyl peroxy-dicarbonate; azo compounds such as 2,2-azobisisobutyronitrile, azobis-2,4-dimethylvaleronitrile, azobiscyclohexylnitrile, azobiscyanovalerate, 2,2-azobis(2-methylbutyro-nitrile) and the like.

Curing by energy radiation can also be carried out according to conventionally-known techniques. The present composition is caused to cure, for example, when irradiated with an electron beam. Where an ultraviolet radiation is used, a photoinitiator, polymerization promoter, auxiliary photoinitiator or the like may preferably be added to the present composition to accelerate the curing. Useful photoinitiators are known in the art, examples of which include acetophenone compounds, benzoin ether compounds, benzophenone compounds, thioxanthone compounds and the like, such as described in "Fine Chemical" Journal, vol.22, No.20 (pp.16–33, published in 1993). Examples of acetophenone compounds include diethoxyacetophenone, 2-hydroxy-2-methyl-1-phenylpropane-1-one, 1-(4-isopropylphenyl)-2-hydroxy-2-methylpropane-1-one, 1-(4-dodecylphenyl)-2-hydroxy-2-methylpropane-1-one, 4-(2-hydroxyethoxy)phenyl-(2-hydroxy-2-propyl)ketone, 1-hydroxycyclohexyl-phenylketone, 2-methyl-1-[4-(methylthio)phenyl]-2-morpholinopropanone-1,2-benzyl-2-dimethylamino-1-(4-morpholinophenyl)-butanone-1, 4-phenoxy-dichloroacetophenone, 4-tert-butyldichloroacetophenone, 4-tert-butyltrichloroacetophenone and the like. Examples of benzoin ether compounds include benzoin, benzoin methyl ether, benzoin ethyl ether, benzoin isopropyl ether, benzoin isobutyl ether, benzyldimethylketal and the like. Useful benzophenone compounds include, for example, benzophenone, ortho-benzoylbenzoic acid, ortho-benzoylmethyl benzoate, 4-phenylbenzophenone, 4-hydroxybenzophenone, 2,4,6-trimethylbenzophenone and the like. Useful thioxanthone compounds include, for example, thioxanthone, 2-chlorothioxanthone, 2-methylthioxanthone, 2,4-dimethylthioxanthone, 2-isopropylthioxanthone, 2,4-diisopropylthioxanthone, 2,4-diethylthioxanthone, 2,4-dichlorothioxanthone, 1-chloro-4-propoxythioxanthone and the like. Also, acyl phosphine oxides such as 2,4,6-trimethylbenzoyldiphenyl phosphine oxide can be used as a special system. Other useful compounds include benzyl, 9,10-phenanthrenequinone, 2-ethylanthraquinone, camphorquinone, methylphenylglyoxy ester, 3,3',4,4'-tetra (tert-butylperoxycarbonyl) benzophenone and the like. Those photoinitiators can be used alone or in combination. While not particularly limited, the amount of the photoinitiator used may be generally in the approximate range of 0.1–30 parts by weight, preferably of 1–5 parts by weight, based on 100 parts by weight of monomer components. Useful polymerization promoters and auxiliary photoinitiators include, for example, triethanolamine, methyldiethanolamine, triisopropanolamine, 4-dimethylamino methyl benzoate, 4-dimethylamino ethyl benzoate, 4-dimethylamino isoamyl benzoate, 4-dimethylamino amyl benzoate, 4-dimethylamino-2-ethylhexyl benzoate, N,N-dimethyl para-toluidine, 4,4'-dimethylaminobenzophenone, 4,4'-diethylaminobenzophenone and the like. While not particularly limited, the amount of the polymerization promotor or auxiliary photoinitiator used may be generally in the approximate range of 0.01–10 parts by weight, preferably of 0.5–3 parts by weight, based on 100 parts by weight of the photoinitiator.

In the case where the curable coating contains an organic solvent, the organic solvent may be caused to evaporate before exposure to an energy radiation. To this end, conventional drying techniques may suitably be employed including hot-air drying, infrared drying, ultra-infrared drying and the like.

While applicable to substantially all material types including wood, metals, synthetic resins, ceramics and others, the present coating composition, if used as curable coatings, may preferably be applied to wood and synthetic resins.

The metals to which the present composition can be applied are not particularly limited, examples of which include pure metals such as iron, copper, nickel, chromium, zinc, lead, tin, titanium, aluminum and the like; alloys containing any combination of these metals and the like. Illustrative of specific metal forms are plates, rods, pillars, pipes, tanks, wires, building and structure frames, window frames, bodies for automobiles, trains and airplanes, lighting equipments, indicators, household appliances, general office equipments, furniture, toys and the like.

The synthetic resins to which the present composition can be applied are not particularly limited, examples of which include thermoplastic and thermosetting resins, such as polymethyl methacrylate resins, polycarbonate resins, polyallyl diglycidyl carbonate resins, ABS resins, polystyrene resins, polyester resins, acetate resins, polyvinyl chloride resins, epoxy resins, acrylic resins, unsaturated polyester resins, polyolefin resins and the like. Specific examples of synthetic resin products are for vehicle uses, typically including glass substitutes (windshield, rear window, opera window, three-cornered window and sunroof, etc.) for transports such as automobiles, trains and aircrafts, and automobile interior and exterior parts such as lamps (head lamp, tail lamp and turn signal, etc.), various meters and dials, bumpers and wheel covers; for appliance uses, typically including parts for refrigerators, cleaners, television sets and air-conditioners, etc.; for general device uses, typically including parts for computers, printers, copiers, facsimiles, optical discs, phones and wireless devices, etc.; for miscellaneous uses, typically including toys, furniture, packages, sporting goods, parts for computer game devices, etc.; for civil engineering and construction uses, typically including lighting plates, window glasses, window frames, wall materials, insulations, flooring and roofing materials, soundproofing plates, etc.; for optical device uses, typically including lenses for glasses, contact lenses, cameras; for medical device uses; for general industrial material uses and for nuclear-associated uses.

BEST MODES FOR CARRYING OUT THE INVENTION

The present invention will be now described in detail with reference to Synthesis Examples, Examples, Comparative Examples and Experimental Examples. Whenever used herein, "parts" and "%" mean "parts by weight" and "% by weight", respectively.

The synthetic intermediates of the vinyl-containing 2,2'-bis(6-benzotriazolyl phenol) compound of the present invention, i.e., 2-(2'-hydroxy-5'-methacryloyloxyethylphenyl)-2H-benzotriazole, 5-chloro-2-(2'-hydroxy-5'-methacryloyloxyethylphenyl)-2H-benzotriazole, 2-(2'-hydroxy-5'-methacryloyloxypropylphenyl)-2H-benzotriazole, 5-chloro- 2-(2'-hydroxy-5'-methacryloyloxypropylphenyl)-2H-benzotriazole, 2-(2'-hydroxy-5'-acryloyloxyethylphenyl)-2H-benzotriazole, and 5-chloro-2-(2'-hydroxy-5'-acryloyloxyethylphenyl)-2H-benzotriazole were synthesized according to the method described in Japanese Patent Laid Open No. Sho 60-38411.

SYNTHESIS EXAMPLE 1

32.3 g (0.1 mol) of 2-(2'-hydroxy-5'-methacryloyloxyethylphenyl)-2H-benzotriazole, 5.2 g of 80% paraformaldehyde and 11.0 g (0.15 mol) of diethylamine were dissolved in 25 ml of n-butanol. The mixture was heat refluxed at 105° C. for 24 hours. After the reaction was terminated, the solvent and remaining starting materials were recovered under a reduced pressure, so that 41.1 g of 2-(3'-N,N-diethylaminomethyl-2'-hydroxy-5'-methacryloyloxyethylphenyl)-2H-benzotriazole, as a target material, was obtained in the form of brown oil (yield of 96.9% and purity of 96.0%)

1H-NMR(CDCl$_3$): δ=1.09(t, 6H, CH$_3$), 1.91(s, 3H, CH$_3$), 2.60(q, 4H, N—CH$_2$), 2.94(t, 2H, CH$_2$), 3.86(s, 2H, Ar—CH$_2$—N), 4.35(t, 2H, CH$_2$—O), 5.54(s, 2H, vinyl), 6.08(s, 2H, vinyl), 7.03(d, 1H, Ar—H), 7.40(m, 2H, Ar—H), 7.65(s, 1H, Ar—H), 7.96(m, 2H, Ar—H).

SYNTHESIS EXAMPLE 2

12.6 g (30.9 mmol) of crude 2-(3'-N,N-diethylaminomethyl-2'-hydroxy-5'-methacryloyloxyethylphenyl)-2H-benzotriazole, as synthesized in Synthesis Example 1, and 10.0 g (30.9 mmol) of 2-(2'-hydroxy-5'-methacryloyloxyethyl-phenyl)-2H-benzotriazole were dissolved in 64 ml xylene to which 1.5 ml of 28% sodium methylate-methanol solution was subsequently added. The mixture was then refluxed under flowing nitrogen gas for 10 hours. After the reaction was terminated, the mixture was cooled to room temperature. The yellow crystal then deposited was separated by filtration and subsequently recrystalized from isopropyl alcohol, so that 14.6 g of 2,2'-methylene-bis-[(6-(2H-benzotriazole-2-yl)-4-(2-methacryloyloxyethyl)phenol] (hereinafter referred to as RUVA-1) was obtained in the form of white crystal (yield of 70.7% and purity of 98.6%)

1H-NMR(CDCl$_3$): δ=1.86(s, 6H, CH$_3$), 2.99(t, 4H, CH$_2$), 4.27(s, 2H, CH$_2$), 4.37(t, 4H, CH$_2$), 5.45(s, 2H, vinyl), 6.05(s, 2H, vinyl), 7.23(s, 2H, Ar—H), 7.49(m, 4H, Ar—H), 7.92(m, 4H, Ar—H), 8.21(s, 2H, Ar—H), 11.60(s, 2H, Ar—OH).

SYNTHESIS EXAMPLE 3

35.8 g (0.1 mol) of 5-chloro-2-(2'-hydroxy-5'-methacryloyloxyethylphenyl)-2H-benzotriazole, 5.2 g of 80% paraformaldehyde and 11.0 g (0.15 mol) of diethylamine were dissolved in 25 ml of n-butanol. The mixture was heat refluxed at 105° C. for 24 hours. After termination of the reaction, the solvent and remaining starting materials were recovered at a reduced pressure, so that 47.6 g of 5-chloro-2-(3'-N, N-diethylaminomethyl-2'-hydroxy-5'-methacryloyloxyethylphenyl)-2H-benzotriazole, as a target material, was obtained in the form of brown oil (yield of 96.9% and purity of 96.0%).

1H-NMR(CDCl$_3$): δ=1.09(t, 6H, CH$_3$), 1.87(s, 3H, CH$_3$), 2.60(q, 4H, N—CH$_2$), 2.97(t, 2H, CH$_2$), 3.86(s, 2H, Ar—CH$_2$—N), 4.35(t, 2H, CH$_2$—O), 5.48(s, 2H, vinyl), 6.04(s, 2H, vinyl), 7.07(d, 1H, Ar—H), 7.38(d, 1H, Ar—H), 7.83(d, 1H, Ar—H), 7.87(s, 1H, Ar—H), 8.21(s, 1H, Ar—H)

SYNTESIS EXAMPLE 4

15.2 g (30.9 mmol) of crude 5-chloro-2-(3'-N,N-diethylaminomethyl-2'-hydroxy-5'-methacryloyloxyethylphenyl)-2H-benzotriazole, as synthesized in Synthesis Example 3, and 10.0 g (30.9 mmol) of 2-(2'-hydroxy-5'-methacryloyloxyethylphenyl)-2H-benzotriazole were dissolved in 64 ml of xylene, to which 1.5 ml of a 28% sodium methylate-methanol solution was subsequently added. The mixture was then refluxed under flowing nitrogen gas for 10 hours. After termination of the reaction, the mixture was cooled to room temperature. The yellow crystal then deposited was separated by filtration and subsequently recrystalized from isopropyl alcohol, so that 16.1 g of 2,2'-methylene-bis-[6-(2H-benzotriazole-2-yl)-4-(2-methacryloyloxyethyl)phenol] (hereinafter referred to as RUVA-2) was obtained in the form of white crystal (yield of 70.7% and purity of 98.6%).

1H-NMR(CDCl$_3$): δ=1.86(s, 6H, CH$_3$), 2.99(t, 4H, CH$_2$), 4.27(s, 2H, CH$_2$), 4.37(t, 4H, CH$_2$), 5.45(d, 2H, vinyl), 6.05(d, 2H, vinyl), 7.30(s, 2H, Ar—H), 7.60(m, 2H, Ar—H), 8.23(s, 2H, Ar—H), 8.30(s, 2H, Ar—H), 11.60(s, 2H, Ar—OH).

SYNTHESIS EXAMPLE 5

33.7 g (0.1 mol) of 2-(2'-hydroxy-5'-methacryloyloxypropylphenyl)-2H-benzotriazole, 5.2 g of 80% paraformaldehyde and 11.0 g (0.15 mol) of diethylamine were dissolved in 25 ml of n-butanol. The mixture was heat refluxed at 105° C. for 24 hours. After the reaction was terminated, the solvent and remaining starting materials were recovered under a reduced pressure, so that 35.7 g of 2-(3'-N,N-diethylaminomethyl-2'-hydroxy-5'-methacryloyloxypropylphenyl)-2H-benzotriazole, as a target material, was obtained in the form of brown oil (yield of 96.9% and purity of 96.0%)

1H-NMR(CDCl$_3$): δ=1.09(t, 6H, CH$_3$), 1.89(q, 2H, Ar—CH$_2$—), 1.91(s, 3H, CH$_3$), 2.60(q, 4H, N—CH$_2$), 2.94 (t, 2H, CH$_2$), 3.30(t, 2H, CH$_2$), 3.86(s, 2H, Ar—CH$_2$—N), 4.35(t, 2H, CH$_2$—O), 5.54(d, 2H, vinyl), 6.08(d, 2H, vinyl), 7.03(S, 1H, Ar—H), 7.40(m, 2H, Ar—H), 7.65(s, 1H, Ar—H), 7.96(m, 2H, Ar—H).

SYNTESIS EXAMPLE 6

12.1 g (30.9 mmol) of crude 2-(3'-N,N-diethylaminomethyl-2'-hydroxy-5'-methacryloyloxypropylphenyl)-2H-benzotriazole, as synthesized in Synthesis Example 5, and 10.4 g (30.9 mmol) of 2-(2'-hydroxy-5'-methacryloyloxypropylphenyl)-2H-benzotriazole were dissolved in 64 ml of xylene to which 1.5 ml of a 28% sodium methylate-methanol solution was subsequently added. The mixture was then refluxed under flowing nitrogen gas for 10 hours. After termination of the reaction, the mixture was cooled to room temperature. The yellow crystal then deposited was separated by filtration and subsequently recrystalized from isopropyl alcohol, so that 12.2 g of 2,2'-methylene-bis-[6-(2H-benzotriazole-2-yl)-4-(2-methacryloyloxypropyl)phenol]m (hereinafter referred to as RUVA-3) was obtained in the form of white crystal (yield of 70.7% and purity of 98.6%).

1H-NMR(CDCl$_3$): δ=1.88(s, 6H, CH$_3$), 3.02(t, 4H, CH$_2$), 3.30(t, 4H, CH$_2$), 4.27(s, 2H, CH$_2$), 4.40(t, 4H, CH$_2$), 5.50(S, 2H, C=CH$_2$), 6.05(s, 2H, C=CH$_2$), 7.30(s, 2H, Ar—H), 7.49(m, 4H, Ar—H), 7.90(m, 4H, Ar—H), 8.20(s, 2H, Ar—H), 11.80(s, 2H, Ar—OH).

SYNTHESIS EXAMPLE 7

30.9 g (0.1 mol) of 2-(2'-hydroxy-5'-acryloyloxyethylphenyl)-2H-benzotriazole, 5.2 g of 80% paraformaldehyde and 11.0 g (0.15 mol) of diethylamine were dissolved in 25 ml of n-butanol. The mixture was heat refluxed at 105° C. for 24 hours. After the reaction was terminated, the solvent and remaining starting materials were recovered under a reduced pressure, so that 35.0 g of 2-(3'-N,N-diethylaminomethyl-2'-hydroxy-5'-acryloyloxyethylphenyl)-2H-benzotriazole, as a target material, was obtained in the form of brown oil (yield of 96.9% and purity of 96.0%).

1H-NMR(CDCl$_3$): δ=1.09(t, 6H, CH$_3$), 2.60(q, 4H, N—CH$_2$), 2.94(t, 2H, CH$_2$), 3.86(s, 2H, Ar—CH$_2$—N), 4.35(t, 2H, CH$_2$—O), 5.93(d, 1H, vinyl), 6.26(dd, 1H, vinyl), 6.47(d, 1H, vinyl), 7.22(S, 1H, Ar—H), 7.40(m, 2H, Ar—H), 7.65(s, 1H, Ar—H), 7.96(m, 2H, Ar—H).

SYNTESIS EXAMPLE 8

11.2 g (30.9 mmol) of crude 2-(3'-N,N-diethylaminomethyl-2'-hydroxy-5'-acryloyloxyethylphenyl)-2H-benzotriazole, as synthesized in Synthesis Example 7, and 9.5 g (30.9 mmol) of 2-(2'-hydroxy-5'-acryloyloxyethylphenyl)-2H-benzotriazole were dissolved in 64 ml of xylene to which 1.5 ml of a 28% sodium methylate-methanol solution was subsequently added. The mixture was then refluxed under flowing nitrogen gas for 10 hours. After termination of the reaction, the mixture was cooled to room temperature. The yellow crystal then deposited was separated by filtration and subsequently recrystalized from isopropyl alcohol, so that 14.6 g of 2,2'-methylene-bis-[6-(2H-benzotriazole-2-yl)-4-(2-acryloyloxyethyl)phenol] (hereinafter referred to as RUVA-4) was obtained in the form of white crystal (yield of 70.7% and purity of 98.6%).

1H-NMR(CDCl$_3$): δ=2.99(t, 4H, CH$_2$), 4.27(s, 2H, CH$_2$), 4.37(t, 4H, CH$_2$), 5.93(d, 2H, vinyl), 6.26(dd, 2H, vinyl), 6.47(d, 2H, vinyl), 7.23(S, 2H, Ar—H), 7.49(m, 4H, Ar—H), 7.92(m, 4H, Ar—H), 8.21(s, 2H, Ar—H), 11.60(s, 2H, Ar—OH)

SYNTESIS EXAMPLE 9

A mixture of 1 g of RUVA-1 obtained in Synthesis Example 2, 99 g of methyl methacrylate and 2.8 g of azobisisobutyronitrile was slowly added dropwise to 100 g of dimethylformamide maintained at 120° C. in a glass flask equipped with a condenser, nitrogen line, thermometer, dropping funnel and stirrer. The mixture was maintained at the same temperature for additional 4 hours. The resulting reaction solution was charged to a large excess of methanol. The solid then deposited was separated by filtration and then vacuum dried at 40° C. for 15 hours, so that 98 g of a pale yellow powder-form polymer was obtained. GPC analysis using standard polystyrene revealed its weight average molecular weight as being 10,200. Also, $^1$H-NMR analysis and absorbence at maximal absorption wavelength indicated that the polymer obtained was a copolymer of RUVA-1 and methyl methacrylate and that RUVA-1 was contained, as a copolymeric component, in the amount of 0.9% by weight.

SYNTHESIS EXAMPLE 10

The procedure of Synthesis Example 9 was repeated, except that RUVA-1 was replaced by RUVA-2, RUVA-3 or RUVA-4, to obtain copolymers of RUVA-2, RUVA-3 and RUVA-4 with methyl methacrylate.

EXAMPLE 1

70 parts of polymethyl methacrylate sold in the market and 30 parts of the polymer obtained in Synthesis Example 9 were dissolved in 500 parts of 1,1,2,2-tetrachloroethane. This solution was coated on a 30 mm diameter, circular silica plate using a spinner. The resulting coating film was air dried for 1 hour and then suction dried at 60° C. for 12 hours to prepare an about 1 μm thick, unform thin film on the circular silica plate.

EXAMPLE 2

The procedure of Example 1 was repeated, except that the polymer obtained in Synthesis Example 9 was replaced by the polymer obtained in Synthesis Example 10, to prepare silica plates coated with polymethyl methacrylate containing different types of RUVA-methyl methacrylate copolymers.

COMPARATIVE EXAMPLE 1

91 parts of polymethyl methacrylate sold in the market and 9 parts of 2-(2'-hydroxy-5'-methylphenyl)benzotriazole (hereinafter referred to as Comparative UVA-1) were dissolved in 500 parts of 1,1,2,2-tetrachloroethane. This solution was coated on a 30 mm diameter, circular silica plate using a spinner. The resulting coating film was air dried for 1 hour and then suction dried at 60° C. for 12 hours to prepare an about 1 μm thick, unform thin film on the circular silica plate.

COMPARATIVE EXAMPLE 2

91 parts of polymethyl methacrylate sold in the market and 9 parts of 2-[2'-hydroxy-3',5'-di(tert-butyl)phenyl]m benzotriazole (hereinafter referred to as Comparative UVA-2) were dissolved in 500 parts of 1,1,2,2-tetrachloroethane. This solution was coated on a 30 mm diameter, circular silica plate using a spinner. The resulting coating film was air dried for 1 hour and then suction dried at 60° C. for 12 hours to prepare an about 1 um thick, unform thin film on the circular silica plate.

EXPERIMENTAL EXAMPLE 1

The polymethyl metacrylate-coated silica plates, as prepared in Example 1, Example 2, Comparative Example 1 and Comparative Example 2, were immersed in hot water maintained at 70° C. Each coating film was measured for absorbency at 340 nm at predetermined time intervals.

The absorbency retention factor (%) was given by [(absorbency after 10 hours/initial absorbency)×100]m. The absorbency retention factors both after 10 hours and after 40 hours were calculated for each of the coating films of Example 1, Example 2, Comparative Example 1 and Comparative Example 2. The results are shown in Table 1.

TABLE 1

|  | UVA | Absorbency Retention Factor/% | |
|---|---|---|---|
|  |  | After 10 hrs. | After 40 hrs. |
| Example 1 | RUVA-1 | 99 | 99 |
| Example 2 | RUVA-2 | 100 | 99 |
|  | RUVA-3 | 99 | 99 |
|  | RUVA-4 | 99 | 99 |
| Comp. Example 1 | Comp. UVA-1 | 5 | 0 |
| Comp. Example 2 | Comp. UVA-2 | 80 | 24 |

The results have demonstrated that the polymethyl methacrylate films, respectively containing the ultraviolet-absorbing copolymers of the present invention, show no elution and substantially keep their initial absorbency levels, while the coating films of Comparative Examples 1 and 2, respectively containing conventional additive-type ultraviolet absorbers, show the linear reduction in absorbency because of elution thereof.

EXAMPLE 3

4.0 g of polyurethane acrylate oligomer (product name: ATERESIN UN3320HA, manufactured by Negami Kogyo Co., Ltd.), 3.0 g of pentaerythritol triacrylate, 3.0 g of dipentaerythritol hexaacrylate, 0.3 g of initiator (product name: Darocur 1173, Chiba-Geigy Co., Ltd.), 1.0 g of methylethylketone and 0.3 g of RUVA-1 obtained in Synthesis Example 2 were mixed to prepare a curable coating. The curable coating was applied by a bar coater onto a 3 mm thick polycarbonate plate to a thickness of 5 up and then dried in a dryer with 70° C. hot-air circulation for 15 minutes. The curable coating, while moved at a line speed of 2 m/min, was irradiated in the air with a high-pressure mercury lamp (80 w/cm). As a result, the UV-cured coating film was formed.

EXAMPLE 4

4.0 g of polyurethane acrylate oligomer (ATERESIN UN-3320HA), 3.0 g of pentaerythritol triacrylate, 3.0 g of dipentaerythritol hexaacrylate, 0.3 g of initiator (Darocur 1173), 1.0 g of methylethylketone and 0.3 g of RUVA-4 obtained in Synthesis Example 8 were mixed to prepare a curable coating. The curable coating was applied by a bar coater onto a 3 mm thick polycarbonate plate to a thickness of 5 pm and subsequently dried in a dryer with 70° C. hot-air circulation for 15 minutes. The curable coating, while moved at a line speed of 2 m/min, was irradiated in the air with a high-pressure mercury lamp (80 w/cm). As a result, the UV-cured coating film was formed.

COMPARATIVE EXAMPLE 3

4.0 g of polyurethane acrylate oligomer (ATERESIN UN-3320HA), 3.0 g of pentaerythritol triacrylate, 3.0 g of dipentaerythritol hexaacrylate, 0.3 g of initiator (Darocur 1173), 1.0 g of methylethylketone and 0.3 g of Comparative UVA-2 were mixed to prepare a curable coating. The curable coating was applied by a bar coater onto a 3 mm thick polycarbonate plate to a thickness of 5 μm and subsequently dried in a dryer with 70° C. hot-air circulation for 15 minutes. The curable coating, while moved at a line speed of 2 m/min, was irradiated in the air with a high-pressure mercury lamp (80 w/cm). As a result, the UV-cured coating film was formed.

COMPARATIVE EXAMPLE 4

4.0 g of polyurethane acrylate oligomer (ATERESIN UN-3320HA), 3.0 g of pentaerythritol triacrylate, 3.0 g of dipentaerythritol hexaacrylate, 0.3 g of initiator (Darocur 1173), 1.0 g of methylethylketone and 0.3 g of Comparative UVA-3 (2(2'-hydroxy-5'-methacryloxyphenyl)-2H-benzotriazole (product name: RUVA-93, manufactured by OTSUKA CHEMICAL CO., LTD.) were mixed to prepare a curable coating. The curable coating was applied by a bar coater onto a 3 mm thick polycarbonate plate to a thickness of 5 μm and then dried in a dryer with 70° C. hot-air circulation for 15 minutes. The curable coating, while moved at a line speed of 2 m/min, was irradiated in the air with a high-pressure mercury lamp (80 w/cm). As a result, the UV-cured coating film was formed.

EXPERIMENTAL EXAMPLE 2

For comparative purposes, the polycarbonate plates carrying the respective UV-cured coating films, as obtained in Examples 3 and 4 and Comparative Examples 3 and 4, were measured for pencil hardness, abrasion resistance, adhesion and weather resistance.

(1) Pencil Hardness

Measurements were conducted according to JIS-K-5400.

(2) Abrasion Resistance

Each coating film was rubbed with a #0000 steel wool to determine its level of abrasion resistance according to the following criterions.

A: Slight or no scuff mark left if rubbed vigorously
B: Appreciable scuff marks left when rubbed vigorously
C: Appreciable scuff marks left (3) Adhesion Each coating film was cross-cut into 100 squares (1 mm×1 mm). A cellophane tape was adhered thereonto and then peeled abruptly at a right angle to determine the adhesion level of each coating film according to the following criterions.

○: No delamination observed
X: Partial delamination observed (4) Weather Resistance Each plate was subjected to a 2,000-hour accelerated weathering test using a duty-cycle sunshine weatherometer WEL-SUN-DC (manufactured by Suga Shikenki Co., Ltd., 18-minute rainfall at 120-minute intervals). After the test, the film condition was observed and the yellowing factor measured. The film condition was determined according to the following criterions.

○: No appreciable change
Δ: Cracking or checking occurred in the film
X: Natural delamination of the entire film

TABLE 2

| | UVA | Pencil Hardness | Abrasion Resistance | Adhesion | Weather Resistance (Film Condition :ΔY1) | |
|---|---|---|---|---|---|---|
| | | | | | After 1000 hrs. | After 2000 hrs. |
| Ex. 3 | RUVA-1 | 5H | A | ○ | ○:0.3 | ○:1.0 |
| Ex. 4 | RUVA-4 | 5H | A | ○ | ○:0.3 | ○:0.9 |
| Comp. Ex. 3 | Comp. UVA-2 | 2H | C | ○ | ○:9.5 | Δ:15.3 |
| Comp. Ex. 4 | Comp. UVA-3 | 3H | B | ○ | ○:0.5 | Δ:1.3 |

The UV-cured film of Comparative Example 3 showed a slight reduction in film hardness due to its incorporation of the additive-type ultraviolet absorber, i.e., the comparative UVA-2, which adversely affected the UV curing reaction. Also, the polycarbonate plate coated with the UV-cured film containing the comparative UVA-2 was apparently caused to yellow violently with weathering test time, due to the reduction in ultraviolet absorbency of the film resulting from the increasing bleedout of the comparative UVA-2 with time. The coating film of Comparative Example 4 containing the reactive-type ultraviolet absorber, i.e., the comparative UVA-3, while showed the reduced hardness, showed no bleedout of the ultraviolet absorber to result in imparting satisfactory weather-resistance to the film and underlying polycarbonate over a longer period. In contrast, the reactive-type UV absorbers of the present invention tend to react with other UV-curable monomers during the UV curing reaction so that they are incorporated in the resulting films in the covalent bond form, while simultaneously showing a crosslinking effect. This resulted in imparting the increased hardness and better weather resistance to the film and underlying polycarbonate, relative to Comparative Example 4.

EFFECTS OF THE INVENTION

In accordance with the present invention, ultraviolet absorbers can be provided which, even if loaded in resins requiring high-temperature fabrication, show no tendency to evaporate during the high-temperature fabrication and bleed out from fabricated resin products. Also, copolymerization thereof allows the extremely easy provision of highly light-resistant polymers which incorporate optional proportions of ultraviolet absorbing units in side chains of addition polymerizable monomers, and additive-type polymeric ultraviolet absorbers that allow such. Furthermore, the resin composition of the present invention, when used as the curable coating, can easily impart the improved chemical, abrasion and weather resistance to shaped articles.

What is claimed is:

1. A bis(benzotriazolyl phenol) compound represented by the following general formula (1)

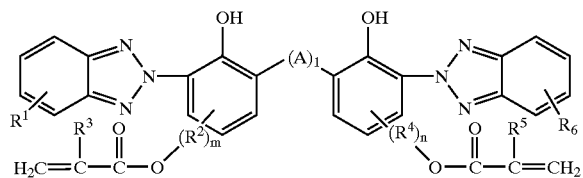

wherein A represents a methylene group, a $(CH_3)_2C$ group or a $C_2H_5(CH_3)C$ group; $R^1$ and $R^6$, either identical to or different from each other, represent a hydrogen atom, an alkyl group having 1–4 carbon atoms, an aryl group, an alkoxy group having 1–4 carbon atoms or a halogen atom; $R^2$ and $R^4$, either identical to or different from each other, represent a straight-chain or branched alkylene group having 1–6 carbon atoms; $R^3$ and $R^5$ each represents a hydrogen atom or a methyl group; and 1, m and n each denotes 0 or 1.

2. An ultraviolet absorber comprising the bis(benzotriazolyl phenol) compound recited in claim 1.

3. A resin composition containing the ultraviolet absorber recited in claim 2.

4. A resin composition prepared by incorporating the ultraviolet absorber recited in claim 2 into a thermally-crosslinking curable resin, ultraviolet curable resin or electron beam curable resin.

5. An ultraviolet-absorbing polymer prepared by copolymerizing the bis(benzotriazolyl phenol) compound of claim 1 with at least one unsaturated monomer.

6. A resin composition characterized as containing the ultraviolet absorber of claim 5.

7. A coating material having at least a part of its resin components, the resin composition of claim 3.

8. A coating material having at least a part of its resin components, the resin composition of claim 4.

9. A coating material having at least a part of its resin components, the resin comosition of claim 6.

10. A coating material having at least a part of its resin components, the ultraviolet-absorbing polymer of claim 5.

* * * * *